Dec. 12, 1944.  S. SCHNELL  2,364,823
PISTON CONSTRUCTION
Filed Sept. 7, 1942  2 Sheets-Sheet 1
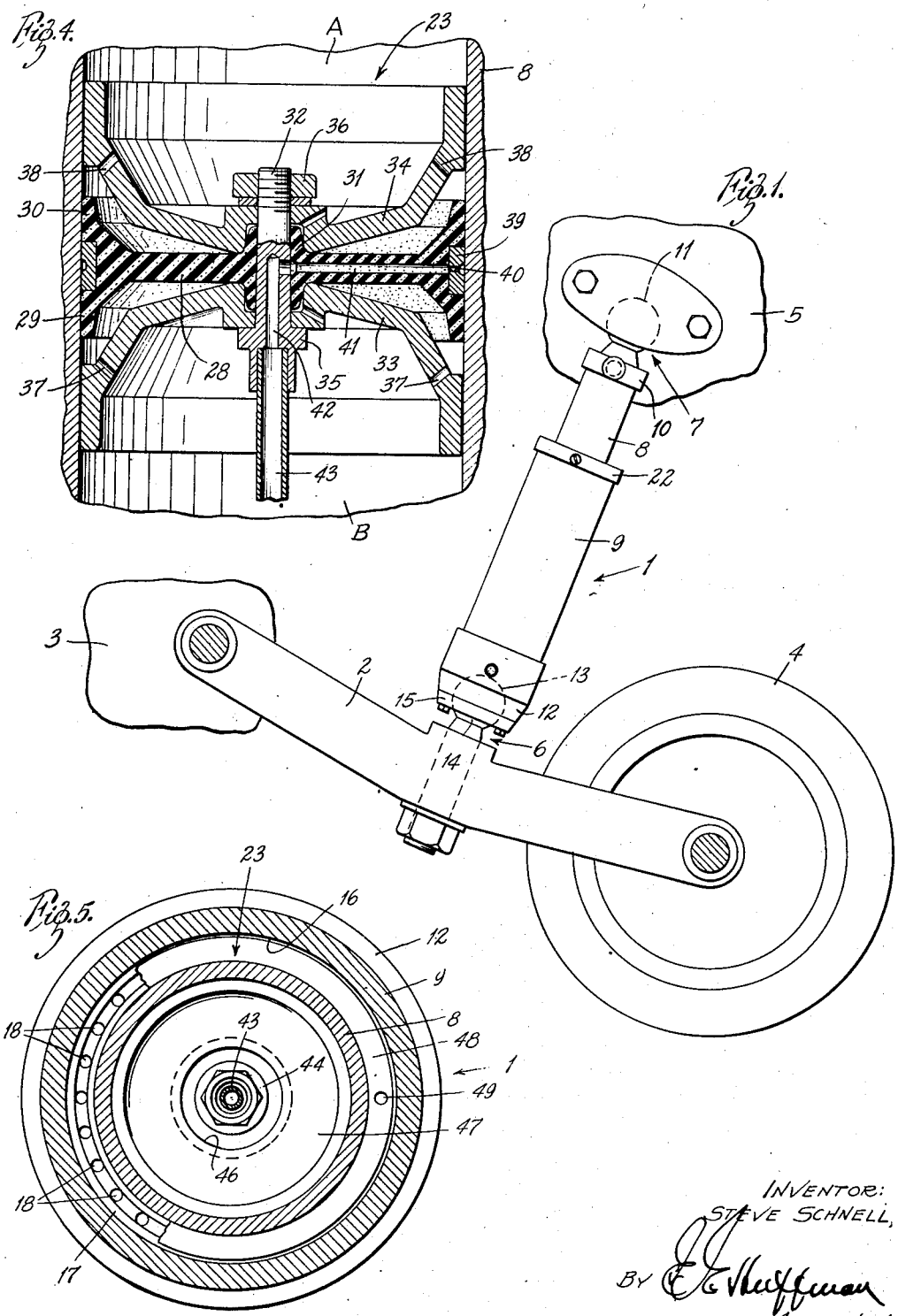
INVENTOR:
STEVE SCHNELL,
BY [signature]
ATTORNEY.

Dec. 12, 1944.     S. SCHNELL     2,364,823
PISTON CONSTRUCTION
Filed Sept. 7, 1942     2 Sheets-Sheet 2
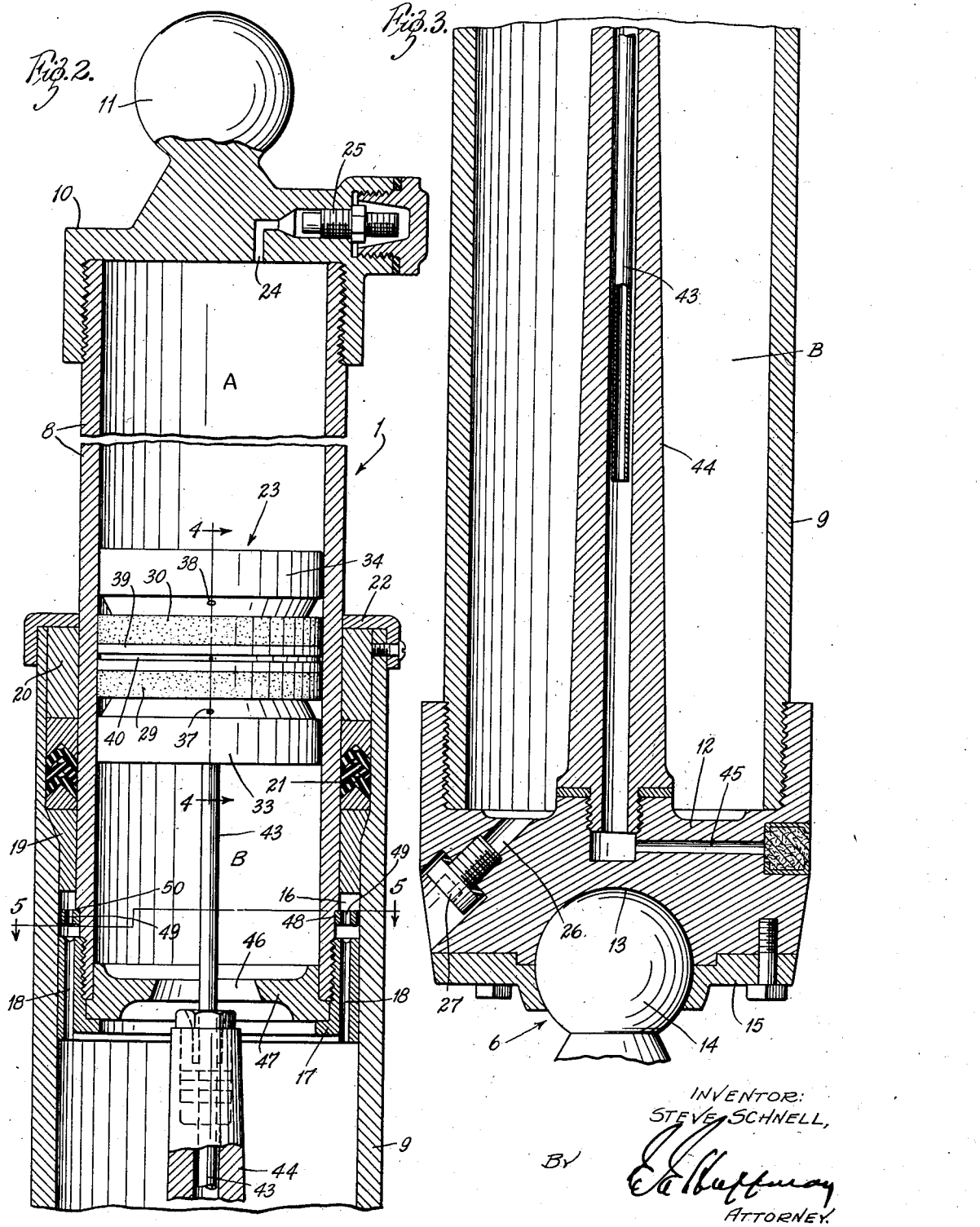
INVENTOR:
STEVE SCHNELL,
BY
ATTORNEY.

Patented Dec. 12, 1944

2,364,823

UNITED STATES PATENT OFFICE 2,364,823

PISTON CONSTRUCTION

Steve Schnell, Kirkwood, Mo., assignor to Wagner Electric Corporation, St. Louis, Mo., a corporation of Delaware Application September 7, 1942, Serial No. 457,615

9 Claims. (Cl. 267—64)

My invention relates to improvements in yieldable devices in which there is a non-compressible fluid and a compressible fluid and more particularly to a piston construction employed as a partition between the fluids.

One of the objects of my invention is to provide piston construction for the use referred to that small variations in fluid pressures effective on one side thereof will be transferred to the fluid on the other side without movement of the sealing means for the piston relatively to the wall engaged thereby.

Another object of my invention is to so employ a diaphragm as a part of a floating partition between two fluids under pressure that it will function as a seal between the fluids and also as a flexible member to permit limited changes in pressures of the fluids without movement of its sealing portion relatively to the wall of the member in which the seal is mounted and also so mounted that during large variations in pressure the diaphragm will be moved bodily to maintain the fluid pressures equal.

Still another object of my invention is to produce an improved yieldable device having relatively movable telescoping cylinders and containing a non-compressible fluid and a compressible fluid under pressure with a movable piston construction as a partition for the fluids.

Other objects of my invention will become apparent from the following description taken in connection with the accompanying drawings in which Figure 1 is a view of an improved yieldable device embodying my invention, said device being used as a strut between a vehicle frame and a wheel thereof; Figures 2 and 3 are enlarged longitudinal sectional views of the upper and lower portions of the yieldable device showing details thereof; Figure 4 is an enlarged sectional view of my improved piston construction; and Figure 5 is a sectional view taken on the line 5—5 of Figure 2.

Referring to the drawings in detail and first to Figure 1, I have shown my improved yieldable device 1 employed, by way of example, as a strut between a wheel of a vehicle and the chassis or body thereof. However, it is noted that the device may be used wherever it is desired to have a yieldable support, a suspension device, a rebound control device, a shock absorbing device, an energy storing device, and so forth. As shown in Figure 1, arm 2 is pivoted at one end to a part of the chassis or body 3 of a vehicle and its other end has rotatably mounted thereon a wheel 4. Between arm 2 and another body part 5 of the vehicle there is interposed the device or strut 1, the connection being made by ball and socket connections 6 and 7.

The yieldable device or strut 1 is shown in detail in Figures 2, 3, 4, and 5, reference to which is now made. The strut is composed of two telescoping cylinders 8 and 9, the former being closed at its upper end by a cap 10 provided with a ball 11 forming part of the ball and socket connection 7, and cylinder 9 being closed at its lower end by a cap 12 provided with a socket 13 for receiving ball 14 of the ball and socket connection 6, said ball being held in the socket by a plate 15. The external diameter of cylinder 8 is somewhat less than the internal diameter of cylinder 9, thus producing a chamber 16 between the walls of the two cylinders. The lower end of cylinder 8, which is received in cylinder 9, carries a sleeve 17 which has such an external diameter as to snugly fit in cylinder 9 in order to properly guide the lower end of cylinder 8. This sleeve is provided with a plurality of circumferentially spaced openings 18 for placing chamber 16 in communication with the interior of cylinder 9 below the sleeve.

The upper end of cylinder 9 carries bearing sleeves 19 and 20, between which is interposed suitable annular packing means 21 to prevent fluid from leaking past the two cylinders yet permitting the cylinders to have relative axial movement. The bearing sleeves and packing means are held in position by a retaining cap 22 secured to the upper end of cylinder 9.

Within cylinder 8 is a special piston construction 23 dividing the space within the two cylinders into an upper chamber A and a lower chamber B, the former being solely within cylinder 8 and the latter within the lower part of cylinder 8 and the cylinder 9, said chamber B also including chamber 16 between the walls of the cylinders. Chamber B is filled with non-compressible fluid such as oil or hydraulic brake fluid and chamber A is filled with a compressible fluid or gas, preferably air, under pressure. Air is admitted into chamber A through an inlet 24 in cap 10 which is controlled by an air pressure check valve 25. The non-compressible fluid is admitted to chamber B through a passage 26 in cap 12 when the closure plug 27 is removed.

When the chambers A and B are filled with fluid with the air in chamber A under pressure, the yieldable device or strut will be in operative condition. Under these conditions the pressures in both chambers are the same as the piston construction only acts as a movable separating wall.

As the device operates when the vehicle moves, cylinders 8 and 9 will move relatively to each other both in an inward and an outward direction. As cylinder 8 moves inwardly with respect to cylinder 9, piston construction 23 will be forced upwardly, thus placing the air in chamber A under additional pressure since the volume thereof will be decreased. When cylinder 8 moves outwardly with respect to cylinder 9, piston construction 23 will move downwardly with respect to cylinder 9 and the volume of chamber A will increase. Since the air in chamber A is compressible, it will act as a cushioning means between the wheel and the frame of the vehicle and thus absorb road shocks.

When a piston of the ordinary type, that is, one with a solid head, is employed, it will move relatively to the cylinder 8 each time there is an increase or a decrease in the force acting on the strut. Since a large majority of the changes in forces acting on the strut will be small due to the wheel moving over a fairly even roadway most of the time, the extent of movement of the piston will be small and in the form of vibrations. These piston vibrations will result in considerable wear on the packing means when such packing means is carried directly by the piston and movable therewith and consequently the life of the packing means will be considerably decreased, thus resulting in a leakage and an undesirable mixing of the fluids.

In accordance with my invention I have provided a piston construction which will eliminate movement of the packing means for the partition each time there are small changes in forces acting on the device or strut, thus preventing considerable wear and yet at the same time the air in chamber A and the liquid in chamber B will always be equalized. As shown in Figure 4, my improved piston construction comprises a diaphragm 28 made of a flexible material such as rubber, synthetic rubber or the like and extending across cylinder 8. The peripheral portion of the diaphragm is formed with oppositely extending annular lips 29 and 30 for cooperation with the cylinder wall, lip 29 being exposed to the pressure of the liquid in chamber B and lip 30 being exposed to the air under pressure in chamber A, thus maintaining said lips in pressure contact with the cylinder wall. The central part of the diaphragm has a hub-like portion 31 for receiving a pin 32 and sealing it thereto. Positioned on opposite sides of the diaphragm are two cup-shaped members 33 and 34 held in clamped relation to the hub of the diaphragm by a shoulder 35 at one end of the pin and a nut 36 at the other end of said pin. The members 33 and 34 have a loose fit in the cylinder and each is so shaped that the peripheral portions thereof are spaced from the peripheral portion of the diaphragm, thus permitting the members to have relative movement with respect to the peripheral portion of the diaphragm before making any contact therewith. The member 33 is provided with perforations 37 in order that the liquid in chamber B may contact the diaphragm at all times and member 34 has perforations 38 in order that the air under pressure in chamber A may contact the diaphragm on the opposite side of the liquid at all times.

With a piston construction as described it is seen that if cylinder 8 moves slightly downwardly with respect to cylinder 9, the diaphragm can flex upwardly over its central portion to maintain the pressures in chambers A and B equal and without any relative movement between the sealing lips of the diaphragm and the wall of cylinder 8. Similarly, when cylinder 8 has a slight upward movement, the central portion of the diaphragm can flex downwardly to maintain the pressures in the two chambers equal without any movement of the sealing lips relatively to the cylinder wall. However, in the event there is such relative movement between cylinders 8 and 9 that the extent of flexing of the central portion of the diaphragm is insufficient to maintain the liquid in chamber B and the air in chamber A equalized, then the peripheral portion of one of the cup-shaped members 33 or 34 will engage the peripheral portion of the diaphragm and move it bodily relatively to the cylinder wall and the piston construction will then act as an ordinary piston with sealing cups at its periphery.

In order to decrease the friction between the diaphragm and the wall of the cylinder, the peripheral portion of the diaphragm between lips 29 and 30 has imbedded therein an annular ring 39 of some suitable bearing material having a less coefficient of friction with the cylinder wall than the material of the diaphragm. This ring is provided with an annular groove 40 which communicates with a radial passageway 41 in the diaphragm leading to an axial passage 42 in the hub pin 32. This latter passage in turn communicates with a tube 43 which is connected to the end of the pin and extends downwardly through chamber B and telescopes with a hollow pin 44 extending upwardly into chamber B from the bottom of cylinder 9. A passage 45 places this hollow pin in constant communication with the atmosphere. By means of this construction it is seen that the annular groove 40 at the rear of the sealing lips 29 and 30 is at all times in communication with the atmosphere regardless of the relative positions the diaphragm and cylinder may assume. By maintaining the rear of the lips of the cups at atmospheric pressure there would be no possibility of a back pressure being built up behind the lips which would tend to break the sealing action of the lips. Thus it is seen that if there should be some leakage of air past the sealing lip 30, this leakage will not decrease the pressure acting on the lip to maintain it in pressure contact with the cylinder wall 8 since the air under pressure which leaks by the lip immediately assumes atmospheric pressure as soon as it reaches the annular groove 40.

Pin 44, into which the tube 43 telescopes, forms a part of a means for controlling the flow of fluid between the two cylinder portions of chamber B and prevents too rapid build up of pressure in the portion of chamber B at the bottom of the piston construction 23. It is desired to control the flow of fluid between these two cylinders when a considerable force acts on the device to move the cylinders toward each other, as, for example, when the entire weight of the vehicle comes down upon a device when a large obstruction is encountered or when the vehicle goes over an embankment. The pin 44 is provided with an external conical surface and extends through an opening 46 in a wall 47 secured to the lower end of cylinder 8 by the bearing sleeve 17.

With this construction it is seen that if cylinder 8 is forced rapidly downwardly from its position shown in Figure 2, the area of the opening 46 will be decreased, thus decreasing the rate of flow between the lower end of cylinder 9 and the lower end of cylinder 8. By decreasing the rate of flow, the downward movement of cylinder 8 will be slowed up or checked. The large force acting to move the cylinders toward each other will thus not become effective suddenly on the piston and air chamber A. The shock is thus slowly absorbed.

Also, in order to check too rapid a separating movement of cylinders 8 and 9, there is provided a ring 48 for cooperation with the upper ends of passages 18 which places chamber 16 in communication with the lower part of cylinder 9. This ring, as seen in Figures 2 and 5, has two openings 49 and when fluid tends to flow out of chamber 16 due to the relative outward movement of cylinders 8 and 9, the ring will seat on top of sleeve 17 and all fluid must flow through these two openings. The ring will have no effect in controlling the flow of fluid through passages 18 when cylinder 8 moves inwardly with respect to cylinder 9 since under these conditions the fluid flowing through passages 18 will lift the ring off sleeve 17 and flow around the ring. The ring in Figure 2 is shown in an unseated position and engaged with a shoulder 50 for limiting its unseating movement.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a device of the class described having a cylinder, a piston construction mounted therein forming separated chambers and fluid normally under equal pressures in said chambers, said piston construction comprising a flexible diaphragm extending across the cylinder and having its peripheral portion in pressure contact with the cylinder wall, and rigid means carried by the central portion of the diaphragm and positioned on opposite sides thereof, said rigid means having peripheral portions spaced apart a greater distance than the axial thickness of the peripheral portion of the diaphragm whereby when there are small momentary changes in pressure of the fluid in one of the cylinders limited flexing of the central portion only of the diaphragm will be present and when there are larger changes in pressure the entire diaphragm will be moved as a result of engagement of the peripheral portion of the diaphragm by a peripheral portion of said means.

2. In a device of the class described having a cylinder, a piston construction mounted therein forming separated chambers and fluid normally under equal pressures in said chambers, said piston construction comprising a flexible diaphragm extending across the cylinder and having its peripheral portion provided with outwardly extending sealing lips held in pressure contact with the cylinder wall by the fluid pressures, and means for limiting the flexing of the central portion of the diaphragm relatively to its peripheral portion when there is a change in the fluid pressures.

3. In a device of the class described having a cylinder, a piston construction mounted therein forming separated chambers and fluid normally under equal pressures in said chambers, said piston construction comprising a flexible diaphragm extending across the cylinder and having its peripheral portion provided with outwardly extending sealing lips held in pressure contact with the cylinder wall by the fluid pressures, members carried on opposite sides of the diaphragm and so associated with the diaphragm as to permit the central part of the diaphragm to have limited flexing in opposite axial directions relatively to its peripheral portion when there are limited changes in pressures of the fluids but causing said diaphragm to move bodily relatively to the cylinder wall when the change in pressure is greater than that necessary to flex the diaphragm to its limit as determined by a member.

4. In a device of the class described having a cylinder, a piston construction mounted therein forming separated chambers and fluid normally under equal pressures in said chambers, said piston construction comprising a flexible diaphragm extending across the cylinder and having its peripheral portion provided with outwardly extending sealing lips held in pressure contact with the cylinder wall by the fluid pressures, means for limiting the flexing of the central portion of the diaphragm relatively to its peripheral portion when there is a change in the fluid pressures, and means for maintaining the rear portion of each lip subject to atmospheric pressure.

5. In a device of the class described having a cylinder, a piston construction mounted therein forming separated chambers and a fluid normally under pressure in each chamber, said piston construction comprising a flexible member extending across the cylinder and having its peripheral portion in sliding pressure contact with the wall of the cylinder, and rigid members secured to opposite sides of the flexible member adjacent its central portion for movement with said central portion and being spaced from the peripheral portion for engagement therewith when a predetermined flexing of the central portion of said flexible member takes place on either side of its normal plane.

6. In a device of the class described having a cylinder, a piston construction mounted therein forming separated chambers and a fluid normally under pressure in each chamber, said piston construction comprising a flexible member extending across the cylinder and having its peripheral portion provided with annular lips extending outwardly on opposite sides thereof and maintained in pressure contact with the cylinder wall by fluid pressure in the chambers, and members secured to the central portion only of the flexible member and positioned on opposite sides thereof, said members having a sliding fit in the cylinder and being so spaced from the flexible member between the central portion and the periphery thereof that the central portion of the flexible member can have a predetermined relative movement with respect to its peripheral portion and on either side of a normal plane of the flexible member.

7. In a yieldable device of the class described, two relatively movable telescoping cylinders having their outer ends closed, a piston construction mounted in one of the cylinders and dividing the cylinders into two chambers, a non-compressible fluid in one chamber and a compressible fluid under pressure in the other chamber, said piston construction comprising a diaphragm having a peripheral portion provided with oppositely extending sealing lips engaging the cylinder wall, means carried by the diaphragm for causing it to have a bodily movement relative to the cylinder wall when the diaphragm is moved by a differential pressure resulting from relative movement of the cylinder but only after a predetermined flexing of its central portion, means establishing an annular space between the lips, and means comprising conduit means extending through the diaphragm for placing the space in communication with the atmosphere at all times.

8. In a yieldable device of the class described, two relatively movable telescoping cylinders having their outer ends closed, a piston construction mounted in one of the cylinders and dividing the cylinders into two chambers, a non-compressible fluid in one chamber and a compressible fluid under pressure in the other chamber, said piston construction comprising a diaphragm having a peripheral portion provided with oppositely extending sealing lips engaging the cylinder wall, means carried by the diaphragm for causing it to have a bodily movement relative to the cylinder wall when the diaphragm is moved by a differential pressure resulting from relative movement of the cylinder but only after a predetermined flexing of its central portion, means establishing an annular space between the lips, an axially extending tube carried by the piston construction, means connecting said tube to atmosphere but permitting movement of the piston construction, and means for placing the tube in connection with said annular space between the lips.

9. In a device of the class described having a cylinder, a piston construction mounted therein forming separated chambers and fluid normally under equal pressures in said chambers, said piston construction comprising a flexible diaphragm directly subject on opposite sides thereof to the fluid pressures in said chambers and extending across the cylinder with its peripheral portion in pressure contact with the cylinder wall, and means associated with the diaphragm for limiting flexing of the central part of the diaphragm relatively to its peripheral portion and the cylinder wall when differential pressures act on opposite sides of the diaphragm.

STEVE SCHNELL.